Oct. 3, 1967 — E. P. MOSLO — 3,344,468
CENTERING INSERT FOR GOLF BALL MOLDING
Filed June 11, 1964
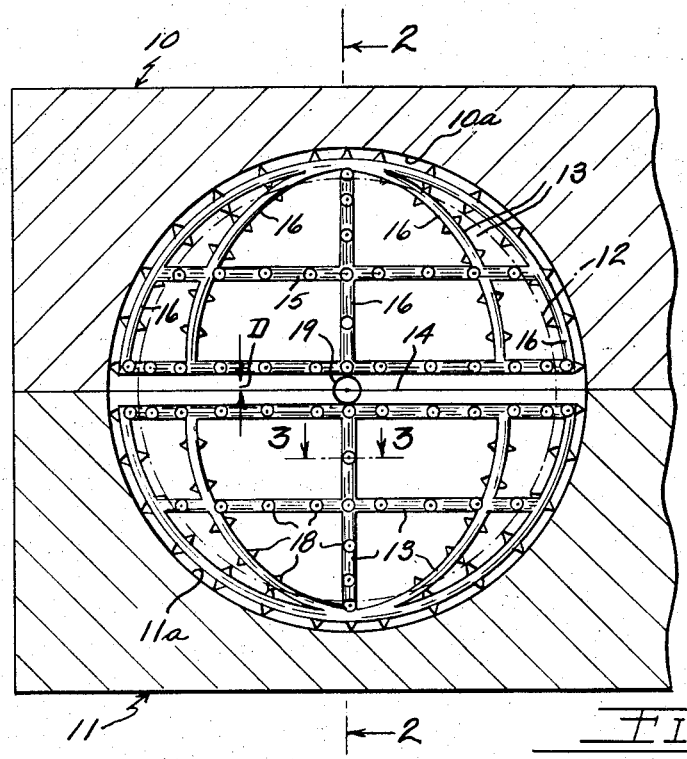
Fig. 1
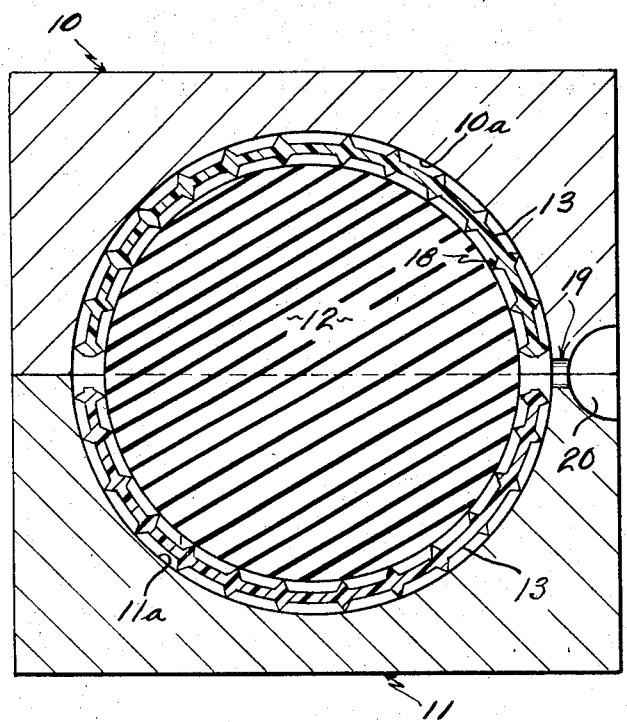
Fig. 2
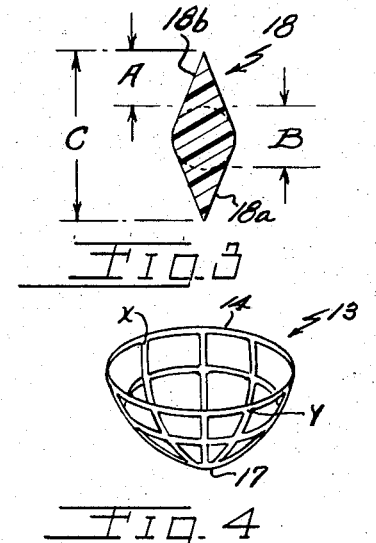
Fig. 3
Fig. 4
INVENTOR.
ERNEST P. MOSLO
BY
Meyer, Baldwin, Doran & Egan
ATTORNEYS

United States Patent Office 3,344,468
Patented Oct. 3, 1967

3,344,468
CENTERING INSERT FOR GOLF
BALL MOLDING
Ernest P. Moslo, 2443 Prospect Ave.,
Cleveland, Ohio 44115
Filed June 11, 1964, Ser. No. 374,522
2 Claims. (Cl. 18—1)

This invention relates to improvements in a centering insert for golf ball molding and in a method of molding a golf ball cover involving the fusing into the cover of a centering insert.

One of the objects of the present invention is to position a spherical golf ball center exactly concentric in a spherical golf ball mold after which the golf ball cover is molded by injection molding. The centering device according to this invention is a spherical open cage of injection-moldable material having generally radially extending projections, some extending outwardly in position to engage the mold walls and some extending inwardly in position to engage the center. The golf ball cover and the centering cage insert are of mutually fusible thermoplastic material so that after the cover is injection molded, the centering cage is fused in the cover to provide a unitary cover structure. In this fashion, the golf ball cover is insured to be of uniform thickness all around the ball so that uniform results occur in play.

Other objects and advantages of the present invention will be apparent from the accompanying drawings and description and the essential features will be set forth in the appended claims.

In the drawings:

FIG. 1 is a central sectional view through a pair of coacting mold halves which together provide a hollow spherical chamber, with the insert of this invention shown in full elevation and with the position of the golf ball center indicated in dot-dash lines;

FIG. 2 is a central sectional view through the same taken along the line 2—2 of FIG. 1;

FIG. 3 is an enlarged transverse sectional view taken along the line 3—3 of FIG. 1 and showing the generally radial projections on one of the bars of the cage-type centering insert; while FIG. 4 is a diagrammatic view of one of the halves of the cage insert on a reduced scale to further illustrate the construction of the cage.

It is well known in the golf ball industry that it is difficult to get the center exactly concentric with the cover so that the golf ball cover is of uniform thickness entirely around the ball so as to give uniform response from the ball when hit during a game of golf. The present invention shows a mold for use in an injection molding machine and having an upper half 10 and a lower half 11, each having a hemispherical hollow chamber indicated respectively at 10a and 11a. When the mold is closed as shown in FIGS. 1 and 2, this then provides a hollow spherical chamber, the walls of which may be dimpled or scored or marked in any particular manner in a pattern to occur on the cover of the finished golf ball. Since such pattern markings have no part in the present invention, smooth walls are indicated for simplicity. The golf ball center is indicated at 12 and may be of any satisfactory known type. Early golf balls utilized a core around which rubber threads were wrapped, but many improved golf ball centers are known to the industry and may be used in carrying out this invention.

The centering device is an open cage adapted to fit snugly between the inner walls of the golf ball cover mold and the outer surface of the golf ball center so as to hold the two exactly concentric. A preferred form for this centering insert involves the use of two slightly less than hemispherical cages as shown at 13 in FIGS. 1 and 2 and diagrammatically in FIG. 4. The two half-cages are exactly alike and one only will be described.

Each half-cage has a base circular ring 14 adapted to lie close to and parallel to a diametrical plane through the center of the golf ball mold. In one successful use of this invention, where the outside diameter of the golf ball cover is 1.712", the distance D in FIG. 1 is approximately 1/16". A second stiffening circular ring 15 is parallel to the ring 14 and intermediate the radius dimension of the golf ball. A plurality of generally half-circular ribs 16 are evenly spaced around the rings 14 and 15 and joined to them and each rib 16 extends from a point X on ring 14 through the polar point 17 of the half-cage 13 to a point Y which is diametrically located on the ring 14 opposite the point X. It should be understood that the half-cage 13 is a unitary structure molded of thermoplastic material by means well known to the industry and all of the parts 14, 15 and 16 are a unitary structure meeting and joining each other at the crossing points indicated in FIG. 4 and all of the ribs 16 joining together at the polar point 17 in a unitary structure there.

As best seen in FIGS. 2 and 3, spacing projections 18 are provided on some or all of the ribs and rings of each half-cage as indicated at 18, some of these projections 18a extending radially outwardly and some of them 18b extending radially inwardly. It is desirable that these projections be of a type which will fuse readily in the golf ball cover when the same is injection molded. The present invention shows them of generally conical shape although this is only a preferred shape for carrying out this invention. In one form of the invention the ribs and rings of the cage are .032" in diameter or dimension B in FIG. 3. The projections 18a and 18b extend for a distance of .022" beyond the diameter of the member to which they are attached, or dimension A of FIG. 3 which gives a total dimension C of FIG. 3 from tip to tip of opposed projections of .076". Referring to FIG. 2, it will be noted that this defines the thickness of the golf ball cover to be injected inasmuch as the points of the projections 18a snugly engage the inner walls of the mold halves 10a and 11a while the points of the radially inwardly extending projections 18b snugly engage the outer surface of the spherical golf ball center 12.

The cage portions 13 are of a thermoplastic material fusible with the material of the golf ball cover. If this requirement is met, then any material suitable for the golf ball cover is suitable for the cage portions 13. Commonly used materials at the present time include balata, acrylonitrile-butadiene-styrene resins commonly referred to in the trade as A.B.S., and polyurethane, either used alone or in combination with the A.B.S. resins. It will be noted that the pointed conical projections 18a and 18b are easily fused into the material of the golf ball cover upon injection molding of the latter.

In use, the golf ball center 12 and two of the half-cages 13 may be positioned in the lower mold half 11 in the position shown in FIG. 2, after which the upper mold half 10 is closed upon the same. A suitable injection gate 19 and runner 20 is provided through the mold half at any desired location and an injection nozzle is properly positioned at the edge of the mold (not shown) for injection molding of the golf ball cover. This will completely fill the annular space between the center 12 and the mold walls 10a and 11a, filling the same with thermoplastic material, which fuses the material of the cages so as to make a unitary cover of uniform thickness over the entire spherical ball. The completed ball shows no evidence of use of the cage.

The purpose of the use of two half-cages each slightly less than hemispherical is to allow room for the plastic to flow unrestricted at the parting line diameter, and also so the plastic will not disturb the cage when it is rushing into the cavity.

What is claimed is:

1. A slightly less than hemispherical open cage of thermoplastic material, two of which cages are adapted to fit snugly between a golf ball mold having a hollow spherical chamber whose walls are adapted to lie outside of said cage and a spherical golf ball center whose outer surface is adapted to lie inside of said cage, two of said cages adapted to substantially completely embrace a golf ball center, said cage material adapted to fuse with a golf ball cover when injection molded between said center and said mold walls, said cage being provided with a plurality of extending projections some extending outwardly in position to engage said mold walls and some extending inwardly in position to engage said center, said projections being the only portion of said cage adapted to engage said mold walls and said center, each said cage having a base circular ring on the flat side of said near-hemisphere and having a plurality of equally spaced generally half circular ribs extending from a first point on said base ring through the polar cap of said hemisphere to a second point on said base ring diametrically opposite said first point, said projections on said ring and ribs being of uniform length and being substantially evenly distributed on said ring and ribs, all of said ribs and ring and projections being a unitary structure, whereby to provide sufficient of said projections evenly distributed over all parts of an enclosed golf ball center to hold it against movement in any direction and insuring true concentricity between such a center and the cover molded upon it, and providing concentrically balanced construction in the finished ball.

2. A cage as defined in claim 1 including a stiffening ring parallel to said base ring lying between said base ring and said polar cap and joined to said ribs.

References Cited

UNITED STATES PATENTS

| | | | |
|---|---|---|---|
| 2,210,954 | 8/1940 | Roberts | 264—320 X |
| 2,376,085 | 5/1945 | Radford | 264—275 |
| 2,597,704 | 5/1952 | Carrson | 264—299 |
| 2,747,230 | 5/1956 | Magnus | 264—275 |
| 2,973,501 | 2/1961 | Mapelsden | 18 |
| 3,044,127 | 7/1962 | Alden | 18 |

FOREIGN PATENTS

| | | |
|---|---|---|
| 1,165,678 | 6/1958 | France. |
| 1,163,009 | 2/1964 | Germany. |
| 787,464 | 12/1957 | Great Britain. |

ALEXANDER H. BRODMERKEL, *Primary Examiner.*

ROBERT F. WHITE, *Examiner.*

R. B. MOFFITT, *Assistant Examiner.*